April 20, 1965  H. H. CHAPMAN  3,179,148
SOLID TIRE
Filed April 30, 1963
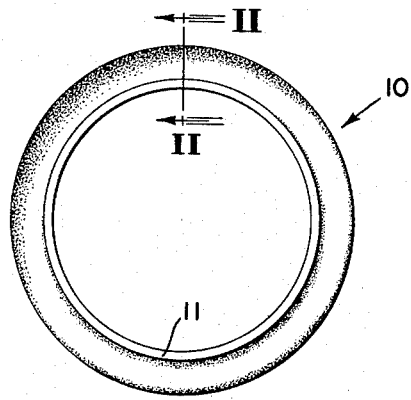
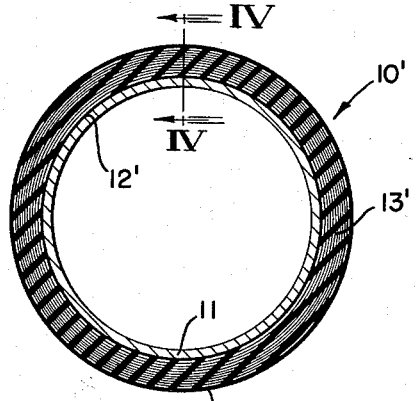
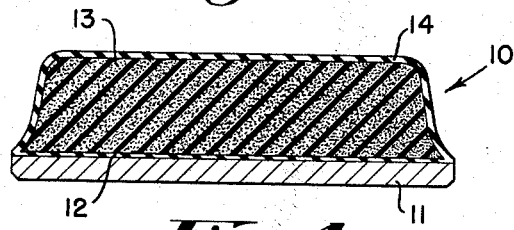
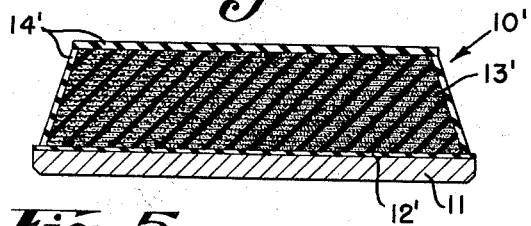
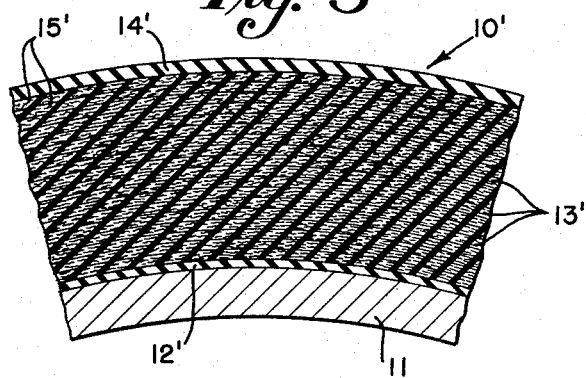
INVENTOR.
HOWARD H. CHAPMAN
BY
*Harvey E Bumgardner Jr*
ATTORNEY.

United States Patent Office

3,179,148
Patented Apr. 20, 1965

3,179,148
SOLID TIRE
Howard H. Chapman, Detroit, Mich., assignor to United States Rubber Company, New York, N.Y., a corporation of New Jersey
Filed Apr. 30, 1963, Ser. No. 276,814
11 Claims. (Cl. 152—310)

This invention relates to solid tires. More particularly, it relates to wire loaded solid tires such as are used on industrial vehicles operating on the type of rough terrain encountered in mines and mills.

A long-standing problem encountered in the employment of solid tires on industrial vehicles operated in heavy or arduous service over broken or uneven surfaces such as are encountered in mills, mines and similar locations has been that such tires so employed have been subject to early failure due to cutting, chipping or chunking. Attempts have been made to solve this problem by the employment of a wire loaded rubber in the body or tread layer of the tire. Such attempts have proceeded on the theory that wire loading would reduce reflection and thereby permit the tire to ride over obstructions.

While such an approach has been successful in reducing early tire failure by cutting, chipping or chunking, it has resulted in the introduction of new sources of early tire failure. The most important of these has been the tendency of the wire loaded layer to separate from the rest of the tire. Attempts to solve this tread separation problem by increasing the thickness of the wire loaded layer have merely shifted the plane of tread separation radially inward in the tire.

Finally, a solution of these problems of early tire failure has been sought in the manufacture of an entire tire of wire loaded stock. This approach has been based on the theory that the wire loading throughout the tire would serve to more readily conduct heat out of the tire thereby preventing failures caused by heat build-up. This approach to early tire failure has also met with indifferent success.

I have now discovered that the provision of a relatively thin damping layer of rubber free of wire loading between the metal band or rim of the tire and the body or tread layer of the tire greatly reduces separation failures in solid wire loaded tires subjected to heavy service while retaining all of the advantages of the employment of a wire loaded tire. This result is quite unexpected because one advantage attributed to wire loaded tires, to wit: high heat conductivity to the rim, is apparently foregone.

Accordingly, it is an object of the present invention to provide a novel and unforeseeably durable construction for solid tires.

It is a further object of this invention to provide a solid wire loaded tire substantially less subject to separation failures than such tires as have heretofore been manufactured.

Other objects and advantages of the invention will become apparent from the following description, when read in conjunction with the accompanying drawings wherein:

FIG. 1 is an axial view of the tire of the instant invention.

FIG. 2 is an enlarged sectional view taken on line II—II of FIG. 1.

FIG. 3 is a cross-sectional view of the tire of the instant invention taken on the same scale and from the same viewpoint as in FIG. 1 showing the laminated tire before curing.

FIG. 4 is an enlarged sectional view taken on line IV—IV of FIG. 3.

FIG. 5 is an enlarged sectional view of a circumferential segment of the uncured tire of FIG. 3 showing the orientation of the wires in the wire loaded stock.

Referring now to the drawings and particularly to FIG. 1 and 2, the tire of the instant invention, designated generally by the reference numeral 10, is comprised of a metal band or rim 11 which will generally be in the form of a right circular cylinder as shown in the drawings, adhered to the band 11 by a suitable bonding agent is a relatively thin damping layer 12 of rubber free of any wire loading. It has been determined that a thickness range of from .010" to .050" for said damping layer 12 gives satisfactory performance, but a thickness of approximately .030" is believed to be optimum. Adjacent and radially external to the damping layer 12 and bonded thereto is the relatively thick layer of wire loaded tread or tire body 13. A relatively thin layer 14 of rubber free from wire loading surrounds and is bonded to the surfaces of the tread layer 13 not in contact with the damping layer 12.

In the preferred method of making the invention, the steel band or rim 11 shown in FIGS. 3, 4 and 5 is first degreased in an alkali soap degreasing solution, then rinsed in cold water and, finally, washed in hot water. A layer of adhesion cement is then applied to the band 11. A single layer 12' of an uncured rubber compound approximately .030" thick is next applied to the band 11 over the adhesion cement to form the damping layer.

Next, using a conventional three roll calender, successive .090" thick laminations 13' of uncured wire loaded rubber stock are continuously applied, using pressure between the band 11 and the bottom roll of the calender, over the damping layer 12' to build up the desired thickness of tread or tire body. The calendering step tends to orient the wires 15 in the wire loaded stock 13' substantially circumferentially (as shown in FIG. 5) with respect to the band 11. Finally, a layer 14' of wire free rubber compound is applied to the surfaces of the built up tire body not in contact with the damping layer 12' for the purpose of protecting the mold from wire damage. The result is the uncured tire 10' shown in FIGS. 3, 4 and 5. The uncured tire 10' is then cured in a conventional mold in a platen press to form the cured tire 10 of the invention.

The compounding recipes in column 3 have been found suitable for the damping layer 12', the tread layer laminations 13' and the cover layer 14', respectively.

While a certain embodiment of the invention has been shown and described, it is to be understood that this is for the purpose of illustration only and that changes and modifications can be made therein without departing from the spirit and scope of the invention.

| Damping Layer | Preferred Parts | Range |
|---|---|---|
| #4 smoked sheet (#4 S.S.) | 100 | #1–#4 smoked sheet or any suitable polymer. |
| Fast curing Zinc Oxide (F.C. ZnO) | 12 | 5–15. |
| #3 Medium Processing Channel Black (MPC Black). | 47.75 | 35–55. |
| Process Oil (partially cracked turpenes and resin acids) ("P.T. Oil" supplied by Godfrey L. Cabot, Inc.). | .4 | .2–.8. |
| Stearic Acid | 2.5 | 1.5–5.0. |
| "BLE" (high temperature reaction product of diphenylamine and acetone) (Supplied by Naugatuck Chemical). | .85 | .5–1.0. |
| Sulphur | 5 | 3–6. |
| MBT (2-mercaptobenzothiazole) | 1 | .5–1.5. |
| Tire Body Laminations: | | |
| #4 S.S. | 100 | |
| F.C. ZnO | 5 | 2–7. |
| #3 MPC Black | 50 | 30–70. |
| Process Oil ("P.T. Oil") | 5 | 3–7. |
| Stearic Acid | 3 | 1–4. |
| Accelerator (N-cyclohexyl-2-benzothiazole sulfenamide) ("CBS" supplied by Naugatuck Chemical). | .37 | .25–1.0. |
| "BLE" | 1 | .5–2.0. |
| Sulphur | 4 | 3–6. |
| ½" x .006" Brass Plated Steel wire. | 35.59 | 30–40. |
| Cover Layer: | | |
| #4 S.S. | 100 | #1–#4 S.S. or any suitable polymer. |
| MPC Black | 50 | 40–60 or High Abrasion Furance Black |
| Stearic Acid | 3 | 2–4. |
| Process Oil ("Tarex" supplied by Godfrey L. Cabot, Inc.). | 5 | Any Process Oil 3–8. |
| F.C. ZnO | 5 | 4–6. |
| "BLE-25" | 1 | .8–1.2. |
| Accelerator ("CBS") | .37 | .3–.5. |
| Sulphur | 4 | 3–5. |

Having thus described my invention, what I claim and desire to protect by Letters Patent is:

1. A solid tire comprising:
   (a) a metal band having an external surface;
   (b) a relatively thin damping layer of rubber adjacent said external surface of said band; and
   (c) a layer of wire loaded tread rubber adjacent and external to said damping layer.

2. A solid tire comprising:
   (a) a metal band having an external surface;
   (b) a damping layer of rubber of from .010" to .050" thickness adjacent said external surface of said band; and
   (c) a layer of wire loaded tread rubber adjacent and external to said damping layer.

3. A solid tire comprising:
   (a) a metal band having an external surface;
   (b) a damping layer of rubber of approximately .030" thickness adjacent said external surface of said band; and
   (c) a layer of wire loaded tread rubber adjacent and external to said damping layer.

4. A solid tire comprising:
   (a) a metal band having an external surface;
   (b) a relatively thin damping layer of rubber adhered to said external surface of said band; and
   (c) a layer of wire loaded tread rubber adjacent and external to said damping layer.

5. A solid tire comprising:
   (a) a metal band having an external surface;
   (b) a damping layer of rubber having a thickness of from .010" to .050" adhered to said external surface of said band; and
   (c) a layer of wire loaded tread rubber adjacent and external to said damping layer.

6. A solid tire comprising:
   (a) a metal band having an external surface;
   (b) a damping layer of rubber having a thickness of approximately .030" adhered to said external surface of said band; and
   (c) a layer of wire loaded tread rubber adjacent and external to said damping layer.

7. A solid tire comprising:
   (a) a metal band having an external surface;
   (b) a relatively thin damping layer of rubber adhered to said external surface of said band; and
   (c) a layer of wire loaded tread rubber adhered to and external to said damping layer, the wires in said tread layer being oriented substantially circumferentially with respect to said band.

8. A solid tire comprising:
   (a) a metal band having an external surface;
   (b) a damping layer of rubber having a thickness of from .010" to .050" adhered to said external surface of said band; and
   (c) a layer of wire loaded tread rubber adhered to and external to said damping layer, the wires in said tread layer being oriented substantially circumferentially with respect to said band.

9. A solid tire comprising:
   (a) a metal band having an external surface;
   (b) a damping layer of rubber having a thickness of approximately .030" adhered to said external surface of said band; and
   (c) a layer of wire loaded tread rubber adhered to and external to said damping layer, the wires in said tread layer being oriented substantially circumferentially with respect to said band.

10. A solid tire comprising:
    (a) a right circular cylindrical steel band having an external surface;
    (b) a relatively thin damping layer of rubber adhered to said external surface of said band; and
    (c) a layer of wire loaded tread rubber adhered to and external to said damping layer, the wires in said tread layer being oriented substantially circumferentially with respect to said band.

11. A solid tire comprising:
    (a) a right circular cylindrical steel band having an external surface;
    (b) a damping layer of rubber having a thickness of from .010" to .050" adhered to said external surface of said band;
    (c) a layer of wire loaded tread rubber adjacent and external to said damping layer; and
    (d) a relatively thin layer of rubber surrounding the surfaces of said tread layer not in contact with said damping layer.

References Cited by the Examiner

UNITED STATES PATENTS

| 1,349,914 | 8/20 | Pratt | 152—323 |
| 1,732,671 | 10/29 | Brill | 152—323 |
| 1,768,348 | 6/30 | Wescott | 152—323 X |
| 2,241,685 | 5/41 | Ware | 152—323 X |
| 3,077,915 | 2/63 | Weber | 152—355 |

ARTHUR L. LA POINT, *Primary Examiner.*